United States Patent [19]

Løken

[11] Patent Number: 5,528,517
[45] Date of Patent: Jun. 18, 1996

[54] METHOD AND SYSTEM FOR MEASURING THE DIMENSIONS OF A THREE-DIMENSIONAL OBJECT

[75] Inventor: Morten Løken, Oslo, Norway

[73] Assignee: Cargoscan A/S, Oslo, Norway

[21] Appl. No.: 175,347

[22] PCT Filed: Jul. 10, 1992

[86] PCT No.: PCT/NO92/00121

§ 371 Date: Jan. 5, 1994

§ 102(e) Date: Jan. 5, 1994

[87] PCT Pub. No.: WO93/01467

PCT Pub. Date: Jan. 21, 1993

[30] Foreign Application Priority Data

Jul. 12, 1991 [NO] Norway .................................. 912756

[51] Int. Cl.[6] .................................................. G01B 11/00
[52] U.S. Cl. .............................. 364/560; 364/564; 33/1 V
[58] Field of Search ...................................... 364/560–564; 177/25, 14; 33/1 V, 706–708; 235/462

[56] References Cited

U.S. PATENT DOCUMENTS

| | | |
|---|---|---|
| 2,736,095 | 2/1956 | Krauss . |
| 4,268,967 | 5/1981 | Brana et al. . |
| 4,270,173 | 5/1981 | Suttler ..................................... 364/560 |
| 4,787,715 | 11/1988 | Ahmed et al. ........................... 364/560 |
| 4,905,512 | 3/1990 | Hayashi ................................... 364/564 |
| 4,991,125 | 2/1991 | Ichikawa ................................. 364/560 |
| 5,027,526 | 7/1991 | Crane . |
| 5,231,596 | 7/1993 | Nakazawa et al. ...................... 364/560 |
| 5,331,118 | 7/1994 | Jensen .................................... 364/564 |

FOREIGN PATENT DOCUMENTS 3427067 2/1985 Germany .

Primary Examiner—James P. Trammell
Attorney, Agent, or Firm—Browdy and Neimark

[57] ABSTRACT

A method and device for measuring the dimensions of a three-dimensional object (8) wherein the object is placed in a measuring corner which defines an x, y, z three-dimensional coordinate system, and wherein in connection with each coordinate at least one graded scale means (9) is provided. Optically machine-legible codes are provided along the respective graded scale means or a combined code for two axes together is provided in at least one of the coordinate planes. The projection of the objects on each coordinate (x,y,z) is registered by means of an opto/electrical reader (1,2) and the signals from the reader are fed into a computer (4) which, on the basis of the received signals for each coordinate, calculates and prints out, or displays, the characteristic data of the object. It can be used, for example, for freight charge calculations relating an object.

15 Claims, 5 Drawing Sheets

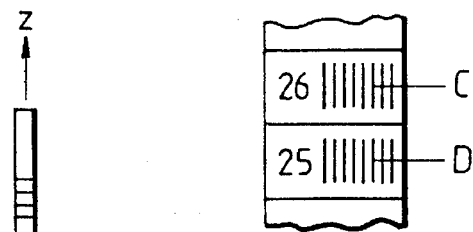
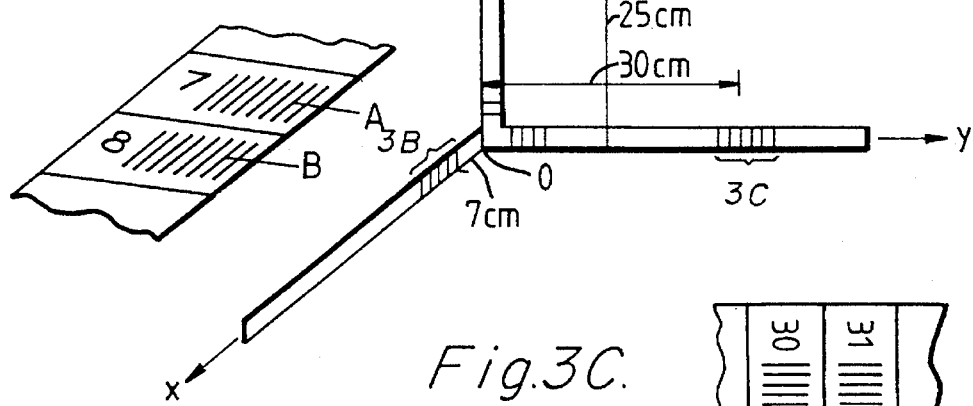
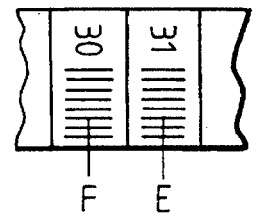
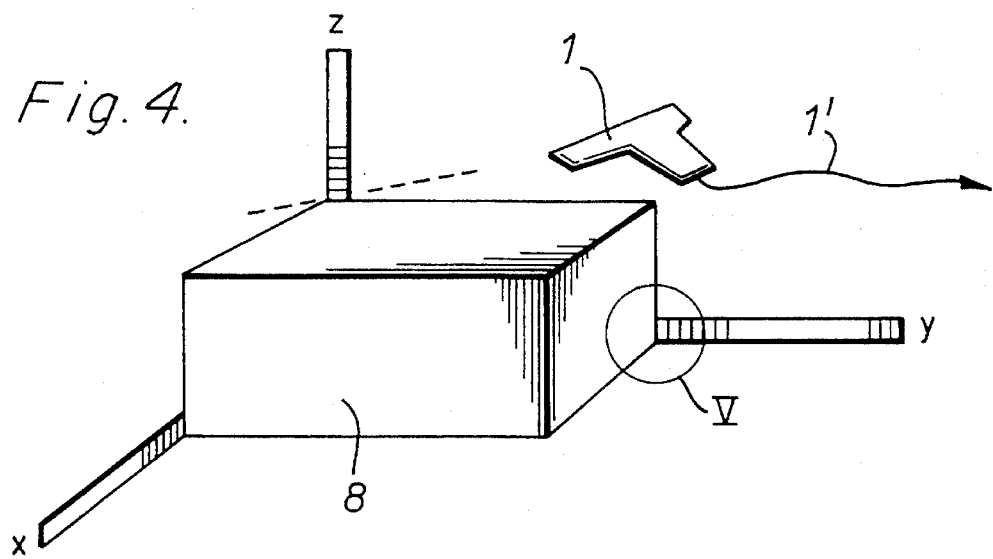

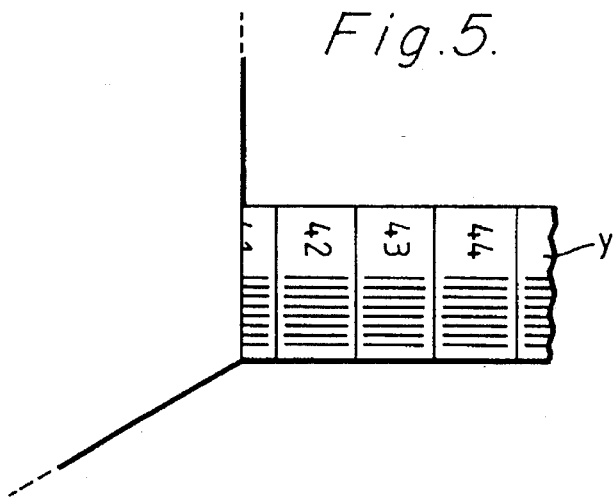
Fig.5.
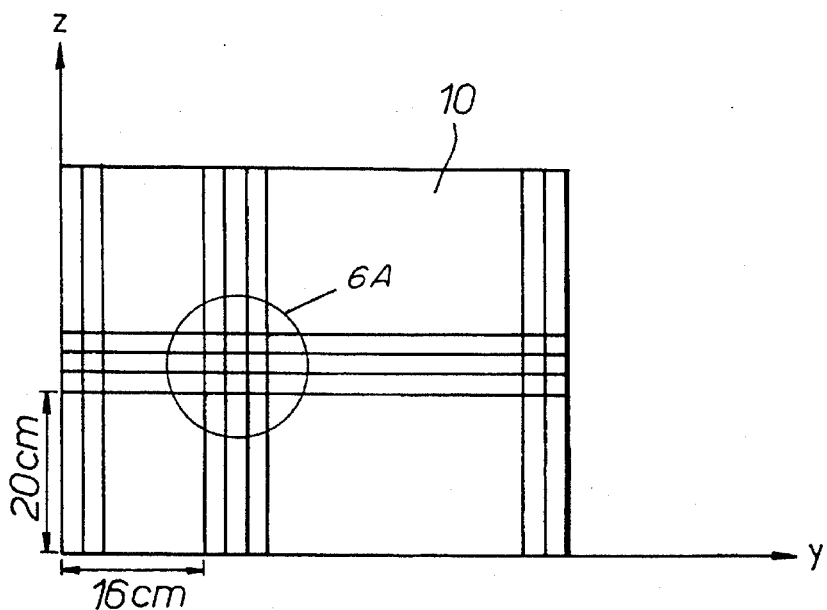
Fig.6.
Fig.6A.

METHOD AND SYSTEM FOR MEASURING THE DIMENSIONS OF A THREE-DIMENSIONAL OBJECT

The present invention relates to a method for measuring diamensions of a three-dimensional object, wherein said object is placed in a measuring corner which defines an x, y, z three-dimensional coordinate system, and wherein in connection with each coordinate at least one graded scale means is provided. Further, the invention relates to a system for measuring dimensions in this way, wherein the corner is formed by two vertical walls, optionally one vertical wall and a graded scale means, which are positioned at mutual angle of 90°, and a horizontal base on which the object is placed when being measured.

Volume measuring devices of this kind are previously known, and U.S. Pat. No. 2,736,095, in particular, teaches one such device where two vertical walls arranged so as to be mutually 90° apart forming a corner together with a conveyor upon which an object is placed. Scale means are disposed in the form of a plurality of graded markings on the two walls so that, for example, the length of the object can be measured along said graded markings by means of a set square whilst said object lies adjacent to one of said walls where curves indicate a defined surface area. Alternative solutions are also found in U.S. Pat. No. 4,268,967. One disadvantage with the known systems is that to take the desired measurements along the coordinates is time-consuming, whereafter the volume must be calculated either by using tables or a separate calculator into which the measured coordinates are entered. For the rational handling of objects such as packages which are to be sent, for example, by mail or another form of transport, it is essential to take readings of and calculate the desired data for the package as quickly as possible.

According to the invention, this is done by using partly known means, per se, and the method is characterized in that the incremental markings on the scale respective means are provided with an optically machine-legible code, for example, a bar code, which represents a respective distance from the origin of the coordinate system, that the code for each coordinate is read by an optical/electrical reader by said reader being moved towards or caused to detect a coded marking at the respective coordinate lying freely nearest to the object, wherein said marking contains both information regarding metric dimension and also the perspective coordinate axis, that the code is registered by the reader, that the code registered by the reader is converted to an electrical signal which is signal-processed on the basis of the received signal for each coordinate, and to calculate and provide a print-out or display of characteristic data of the object, for example, measured x, y and z coordinates, length, width and height, the calculated cubical volume, greatest length plus circumference, etc.

A combined optically machine-legible code can, to advantage, be provided for the respective measuring points in at least one of the planes xy, xz or yz of the coordinate system. Thus, in effect, only two readings are needed to calculate said exemplary disclosed characteristic data of the object. When the method is used for calculating the freight charge, it is expedient to have a computer calculate said freight charge on the basis of said calculated, characteristic data, possibly also the weight of the object.

The system according to the invention is characterized in that the graded scale means has an optically machine-legible code on its respective graduated markings, for example, bar code, that an opto/electrically functioning code reading device is provided, for instance, a manually operated bar code reader, for reading the code which is closest to the respective coordinate, wherein said marking code contains both information regarding metric dimension as well as respective coordinate axis, and that the code reading device is connected to a signal processor for calculating and displaying, for example, by means of an optical display or printer, the characteristic data of the object, for example, x, y, and z coordinates, the cubical volume of the object, the greatest length plus circumference, freight charge, etc, or for data transmission via signal cable to a another signal processor in electronic form for further processing, for instance, automatic invoicing.

According to a further embodiment of the system, said graded scale means is associated with a weighing scale on which the object is placed during the measuring of its dimensions, and a means is provided for transferring the weight data of the object to said computer or said other computer.

The invention shall now be described in more detail with reference to the enclosed drawings:

FIG. 3 depicts a three-dimensional x, y, z coordinate system with the use of scale means as shown in FIG. 2.

FIGS. 3A, 3B and 3C are enlarged views of sections 3A, 3B and 3C, respectively, in FIG. 3.

FIG. 4 shows the use of a measuring corners as shown in FIG. 3 for measuring the dimensions of a package.

FIG. 5 shows the section V in FIG. 4.

FIG. 6 illustrates the use of a combined optically machine legible code which represents two coordinates at respective measuring points in one of the measuring device planes, in FIG. 6 the yz plane.

FIG. 6A is an enlarged view of section 6A in FIG. 6.

Figure 1:
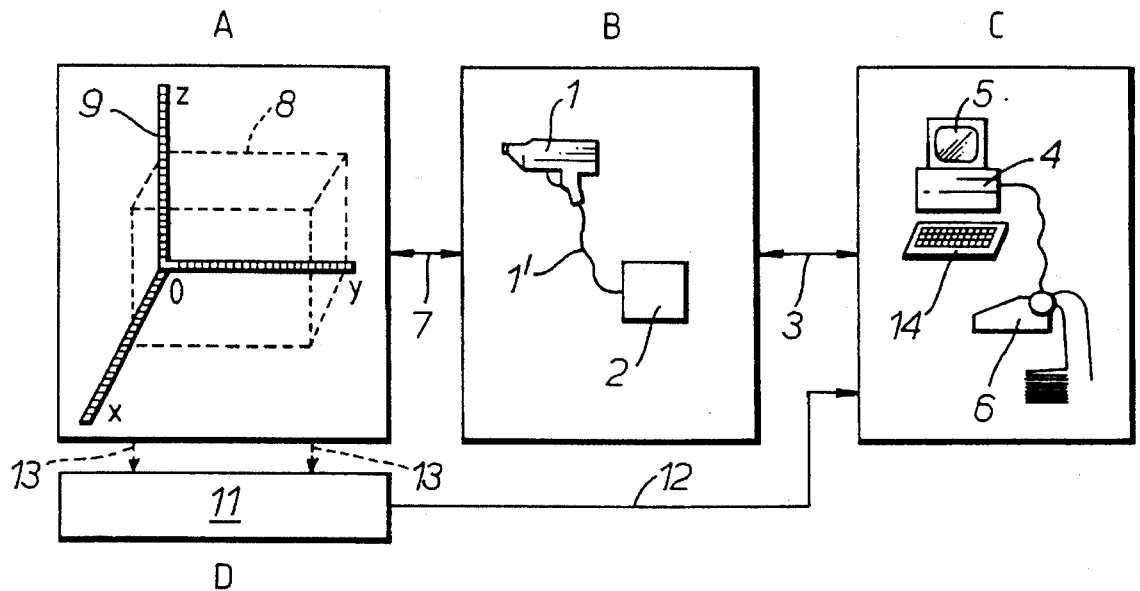
FIG. 1 depicts the system according to the invention.

In FIG. 1, block A illustrates a measuring corner, which, in effect, is a mechanical construction where the respective coordinates x, y and z are provided with markings which represent the distance from origin 0. These markings can expediently be made of bar codes, although this is not considered to be limitative for the concept of the invention. In block B, a bar code reader 1 is shown with a decoder 2, wherein the bar code reader, by means of its detecting beam, intercepts the bar codes at the desired point and transfers these to decoder 2 which converts the detected signals into electrically legible signals which via a connection 3 are transferred to a computer 4 which forms part of a block C. The data may alternatively be transferred via a signal cable to a second computer in electronic form for further processing, for example, automatic invoicing. In block C there is also a data display 5 if non-permanent display is desired, and optionally a printer 6 if a permanent read-out is desired, relating to the characteristic data of the object which is to be placed in the measuring device in block A. It will thus be understood that between block A and block B, the measuring of the object takes place by means of optically reading its dimensions in x, y and z directions. Transfer of information from block A to block B thus occurs optically, as disclosed by reference numeral 7. The object which is to be measured in block A has been given the reference numeral 8 and is indicated in dotted lines.

Figure 2:
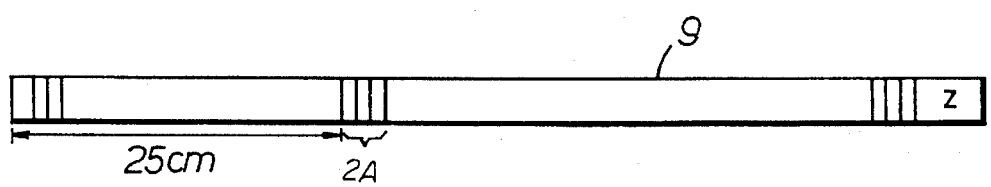
FIG. 2 illustrates a scale means according to the invention.
Figure 2A:
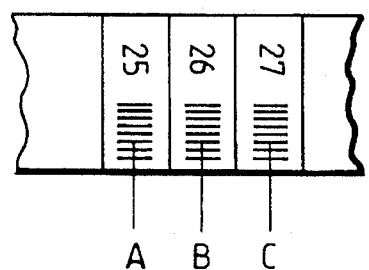
FIG. 2A is an enlarged view of section 2A in FIG. 2.

In FIG. 2 a measuring device 9 is shown in the form of a traditional meter rule. In addition to the measurements being marked by numbers on the meter rule, they are also, in the example shown, marked by bar codes. By reading the bar codes at a point on the meter rule, it is also possible to read the measurement which is also marked by numbers at this point on the meter rule. In FIG. 2A, A thus represents the coordinate Z25 in the bar code, B represents Z26 in the bar code, and C represents Z27 in said bar code.

In the solution in FIG. 3, a measuring corner is provided as is also disclosed in block A in FIG. 1. Three scale means or meter rules are provided as is explained in connection with FIG. 2, in such a way that an axis intersection or corner is thereby formed. In FIG. 3, the x, y, and z directions are more closely defined. In order to avoid confusing x, y and z when making measurements, it would be expedient to use different meter rules in the three different directions. The meter rules can be positioned in such a way that they indicate the distance to origin. On FIG. 3, A indicates X7 in the bar code, B indicates X8, C Z25, D Z26, E Y31 and F Y30 in the bar code. Thus, for example on the meter rule which points in the z direction, the code Z25 will be found in bar code at a distance of 25 cm from the origin. At the same distance 25 is marked is legible numbers on the meter rule.

In FIG. 4, it is illustrated how a package can be measured by placing it innermost in the measuring corner. Consider the package 8 projected normally on each of the three axes in the coordinate system. It is thereby made possible to read the dimensions of the package in the x, y, and z directions by reading the bar code at the points where the projection of the package intersects the three axes. In order to read the bar code said bar code reader 1 is used which, via a cable 1', is linked to a decoder 2, said decoder 2 communicating via an electrical connection 3 with a computer 4, see FIG. 1. The section V in FIG. 4 is shown in more detail in FIG. 5. This is a section of the point at which the dimension is measured in the y direction. The correct reading here will be 42 cm. It will immediately be understood that the x and y dimensions are read in a similar way as described hereinabove for the z dimension in connection with FIG. 4.

By projecting the package 8 on a plane instead of on a line, it is possible to read two coordinates by means of one single reading by using the bar code reader 1. In FIG. 6, this is drawn for the yz plane. A plate or wall 10 is provided with bar codes arranged in a grid. An enlarged section of the grid is shown in FIG. 6A. The bar code in a square indicates the distance of that square from the origin along the y axis and the z axis, respectively. Thus, bar code A in FIG. 6A indicates the coordinate y=18 and z=22, whilst bar code B indicates y=18, z=21.

As another example, it can be mentioned that with a distance of 25 cm from the origin along the y axis and 30 cm from the origo along the z axis, an indication of "Y25 Z30" in bar code is obtained. It would also be expedient for these measurements to be marked in legible numbers in the relevant square in the grid.

Figure 7:
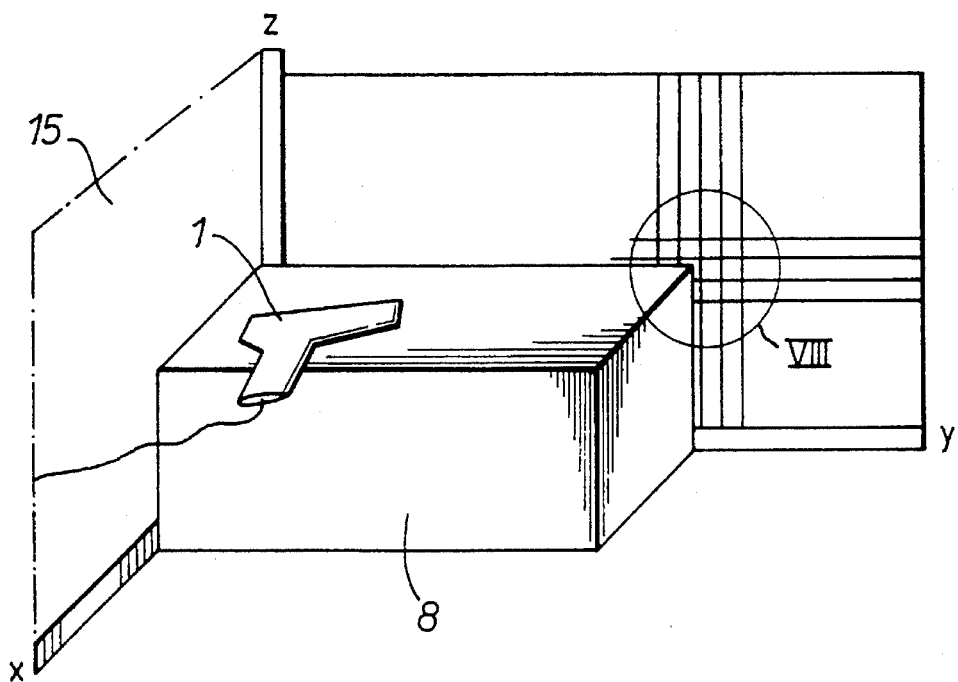
FIG. 7 shows the measuring of the yz coordinate of a corner of an object.
Figure 8:
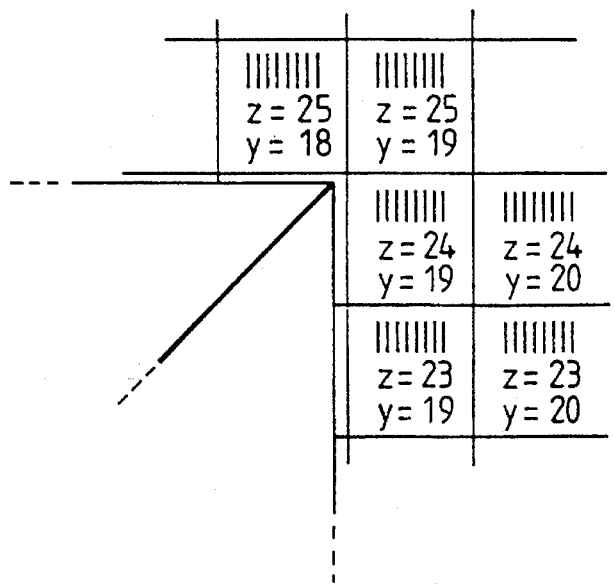
FIG. 8 shows the section VIII in FIG. 7.

In FIG. 7, a practical utilization of the solution in FIG. 6 is shown in more detail where the package is measured by readings being made in the y and z direction in one operation, in addition to the x direction, by the y, z direction being read by making a reading of the bar code which is found at the point where the corner of the package is projected into the yz plane. In the example shown, the correct coordinate for the xz plane will be y=19, z=25, see FIG. 8.

Most bar code readers on the market today are based on HeNe lasers, and these bar code readers generate a clear red beam of light which shows where reading is made. The majority of bar code readers on the market are activated by applying pressure to a "pistol trigger". The light beam is thus switched on. When the code is read an acoustic signal is given, and the light beam is extinguished. It is not switched on again before the "trigger" is pressed once more. The bar code readers function in this way, or can be configured so as to function in this way.

Provided that the bar code reader functions in this way, there will be a good visual/acoustic control of the reading having been made, and that the correct code has been read.

However, bar code readers without visible light may also be used, for example, camera-based readers, but these are more difficult for the operator to use.

In the system that has been described in connection with FIG. 1, a means for weighing the object may optionally be included, symbolized by block D. Block D can contain a known weighing scale 11, know per se, which communicates with block C via a signal path 12. In a case of this kind, it would be expedient to mount the bar code rulers on the weighing scale 11, and possibly subtract the weight of these when weighing the object. If the weight is also of significance in the calculation of the freight charge of the object, it would be desirable to also have the weight of the object fed into the computer 4 together with the other characteristic data of the object 8 which have been registered by means of the reader 1. It is desirable for the xy plane to be in the form of a platform for the object 8 which communicates directly with a weight cell in the weighing scale 11. This is symbolized by the dotted arrows 13 between block A and block D.

The software which is put in the computer 4 coordinates the data which have been fed in and any additional data entered via a keyboard 14, see block C. Additional data of this kind can, for example, be linked to distance of transport, transport means, delivery time, and other freight charge related data. Other relevant data relating to the package (customer number of the sender, package number, addressees postal code, etc.) are often already found in bar code on the package, and can often be read by the same bar code reader.

It will thus be understood that the greatest costs for the development of the present system will be incurred by the construction of a "measuring corner" which describes the three measuring coordinates, as well as by the development of suitable software.

By having all dimensions on a meter rule or gauge plate are marked in the bar code as well as in legible text, it is also enabled manual reading and key entry via the keyboard to the computer 4, for example if the bar code reader 1, for one reason or another, is defect.

One advantage of the invention is that both bar code readers and computers of the type needed for the implementation of the invention can be bought as cheap standard components. The registration system of package data often consists of a weighing scale and a bar code reader linked to a computer. Extra costs for the introduction of volume measurement will thus merely be an up-date of software and the provision of bar code rulers in a system of coordinates.

It is obvious, moreover, for a person skilled in the art that information regarding the axis which is to be measured can be coded in other ways than those which are shown and described in connection with the preceding specification. As an example numerically disclosed data, OCR lettering, can be mentioned. It is also possible to use another form of resolution or denoration. A resolution of less than 1 cm is not practical in the embodiment which is shown in FIGS. 6 and 7. However, a resolution of 1 cm will normally be more than sufficient. A resolution of more than 1 cm, for example, 2–3 cm will usually be sufficient.

Even though in the examples rectangular packages only are shown, it will, of course, also be possible to use the present invention for packages which have an uneven outer contour. The operator is then obliged to project or aim the package in towards the meter rule/measuring plate in order to read the greatest dimension along the respective axes.

Although in the present specification bar code readers, in particular, are described, it will immediately be understood that the present invention shall not be considered restricted to the use of these, but that it would be possible to use other types of optical readers.

It will also be understood that the measuring device itself can be formed in several alternative ways. In principle, it is sufficient to have two walls at the corner, as one wall can be used to read the dimensions in two coordinate directions. As an alternative to one of the two walls, one meter rule can also be provided, as is indicated in FIG. 7. However, it will often be practical to have a wall 15 in the xz plane (as the example in FIG. 7 shows with the reference numeral 15 and dotted line).

As an alternative to using a manually operated optical reader 1, it will also be understood than a fixed mechanical reader unit can be used which reads all visible codes on the walls of the corner and calculates the characteristic dimensions or data of the package 8 on the basis of the codes which are read in this manner. Thus, it will be the lowest numerical value along each axis that will be registered. In this case, a total of three bar code readers will be needed for the x, y and z axes, respectively and a solution as is shown in FIG. 3 or FIG. 4 could be suitable for taking measurements in this way.

Figure 9:
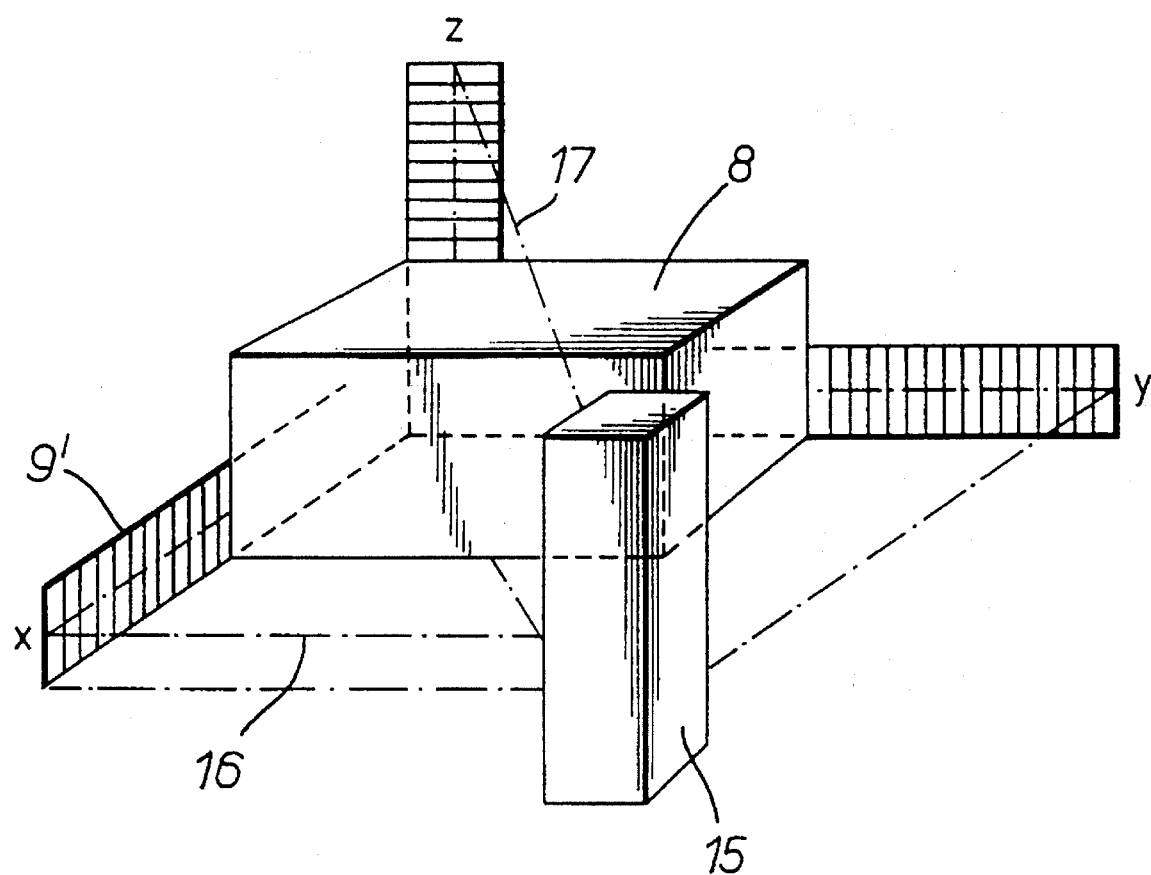
FIG. 9 shows an alternative solution to that which is shown in FIGS. 3 and 4.

FIG. 9 shows an alternative embodiment to that which is shown in FIGS. 3 and 4. Here somewhat wider meter rules 9' are used together with a stationary bar code reader 15 which is capable of reading bar codes of different orientations, for example by transmitting two mutually perpendicular scanning detecting beams 16 and 17 to detect the x and y coordinates, respectively, as well the z coordinate for the object 8. Bar code reader and/or control system must be capable of picking out the lowest values which are registered along the different axes and use these as dimensions of the package.

I claim:

1. A method for measuring the dimensions of a three-dimensional object, wherein the object is placed in a measuring corner which defines an x, y, z three-dimensional coordinate system, and wherein in connection with each coordinate at least one graded scale means is provided, characterized in that at the graded markings of the respective scale means there is provided an optically machine-readable code which represents a respective distance from the origin of the coordinate system, that the code for each coordinate is read by an optical/electrical reader by moving towards or causing the reader to detect a coded marking lying freely closest to the object at the respective coordinate, said marking containing both information regarding metric dimension and also respective coordinate axis, that the code is registered by the reader, that the code registered by the reader is converted to an electrical signal which is signal-processed on the basis of the signal received for each coordinate, and to calculate and provide a print-out or display of characteristic data of the object or to transmit said data in electronic form to a signal processor for further processing.

2. The method as claimed in claim 1, wherein a combined optically machine-legible code for the respective measuring points is arranged in at least one of the planes xy, xz or yz of the coordinate system.

3. The method as claimed in claim 2, wherein the computer calculates a freight charge for the object, on the basis of said calculated characteristic data.

4. The method as claimed in claim 3, wherein said characteristic data includes a weight of the object.

5. The method as claimed in claim 1, wherein the computer calculates a freight charge for the object, on the basis of said calculated characteristic data.

6. The method as claimed in claim 1, wherein said optically machine-readable code is a bar code.

7. The method as claimed in claim 1, wherein said characteristic data include measured x coordinates, measured y coordinates, measured z coordinates, length, width, height, a calculated cubical volume of the object, a greatest length and circumference.

8. The method as claimed in claim 1, wherein said characteristic data include a freight charge.

9. The method as claimed in claim 5, wherein said characteristic data includes a weight of the object.

10. A system for measuring the dimensions of a three-dimensional object, wherein the object is placed in a measuring corner which defines a three-dimensional coordinate system, and wherein in connection with each coordinate at least one graded scale means is provided, and wherein the corner is formed by two vertical walls, possibly a vertical wall and a graded scale means having a mutual angle of 90°, and a horizontal base on which the object is placed when being measured, characterized in that the graded scale means has, at its respective graded markings, an optically machine-legible code, for example, a bar code, that an opto/electrically functioning code-reader device is provided, for reading the code which lies close to the respective coordinate, wherein said marking code contains both information regarding metric dimension and respective coordinate axis, and that the code reader device is connected to a signal processor for calculating and displaying, via an optical display or printer characteristic data of the object, or for data transmission via a signal cable to another signal processor in electronic form for further processing.

11. The system as claimed in claim 10, wherein said graded scale means is associated with a weighing scale on which the object is placed whilst its dimensions are measured, and that a means is provided for transferring weight data of the object to said computer or said another computer.

12. The system as claimed in claim 10, wherein said code reader device is a manually operated bar code reader.

13. The system as claimed in claim 10, wherein said characteristic data include measured x coordinates, measured y coordinates, measured z coordinates, length, width, height, a calculated cubical volume of the object, a greatest length and circumference.

14. The system as claimed in claim 10, wherein said characteristic data include a freight charge.

15. The system as claimed in claim 10, wherein said further processing includes automatic invoicing.

* * * * *